Feb. 28, 1956    R. M. FRANCIS    2,736,349
MACHINE FOR SAWING CONTOURED MARGINS ON STRIPS OR PANELS
Filed April 13, 1953    3 Sheets-Sheet 3
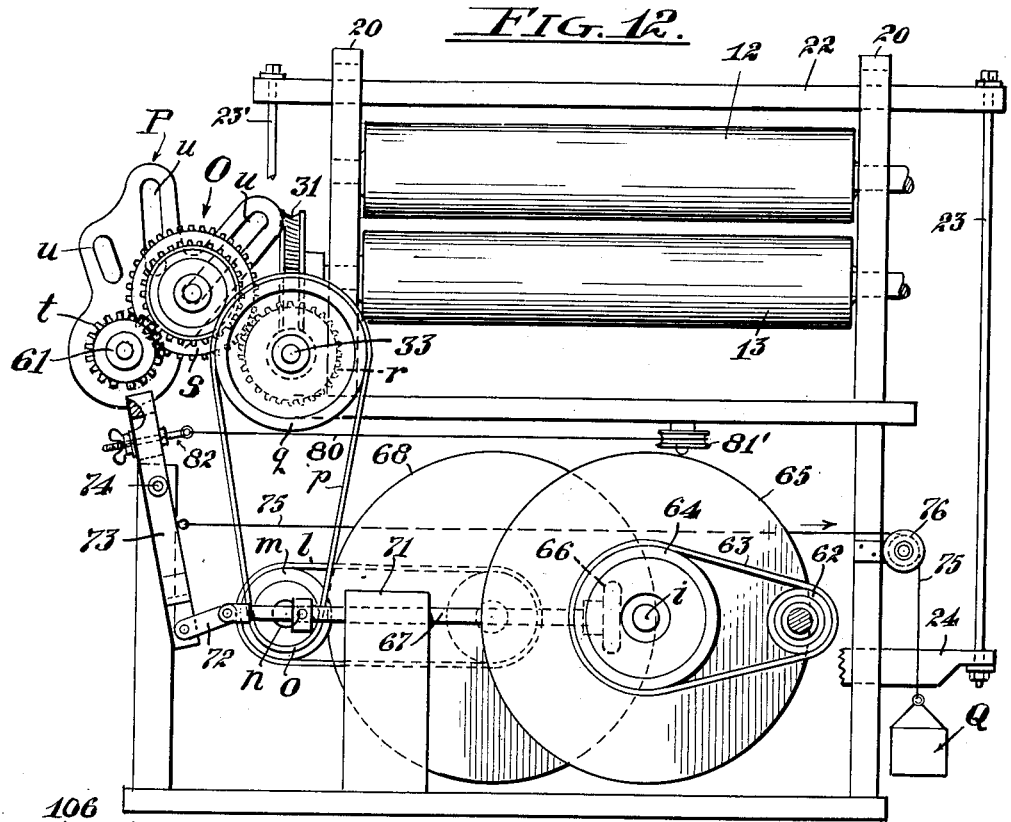

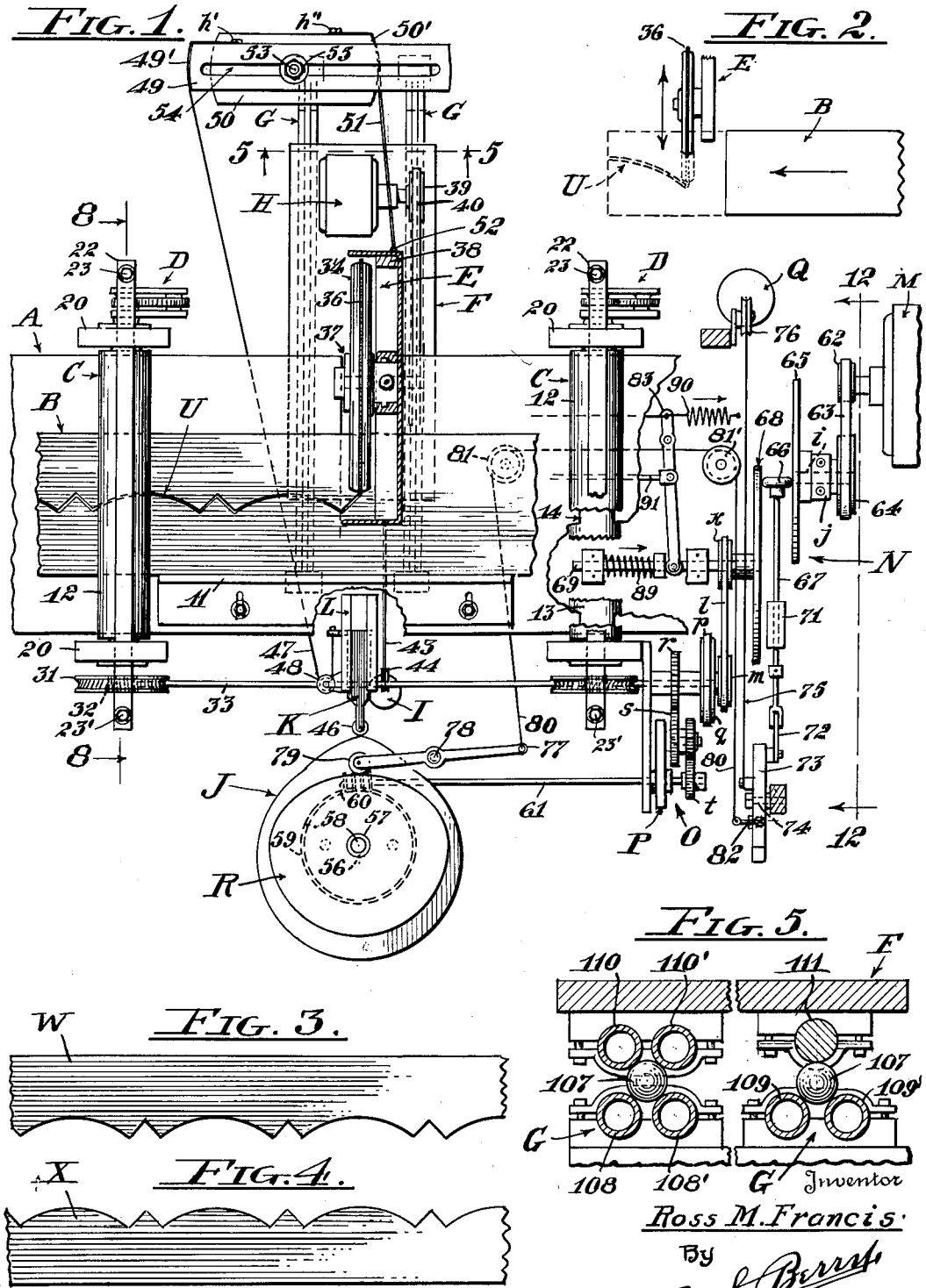

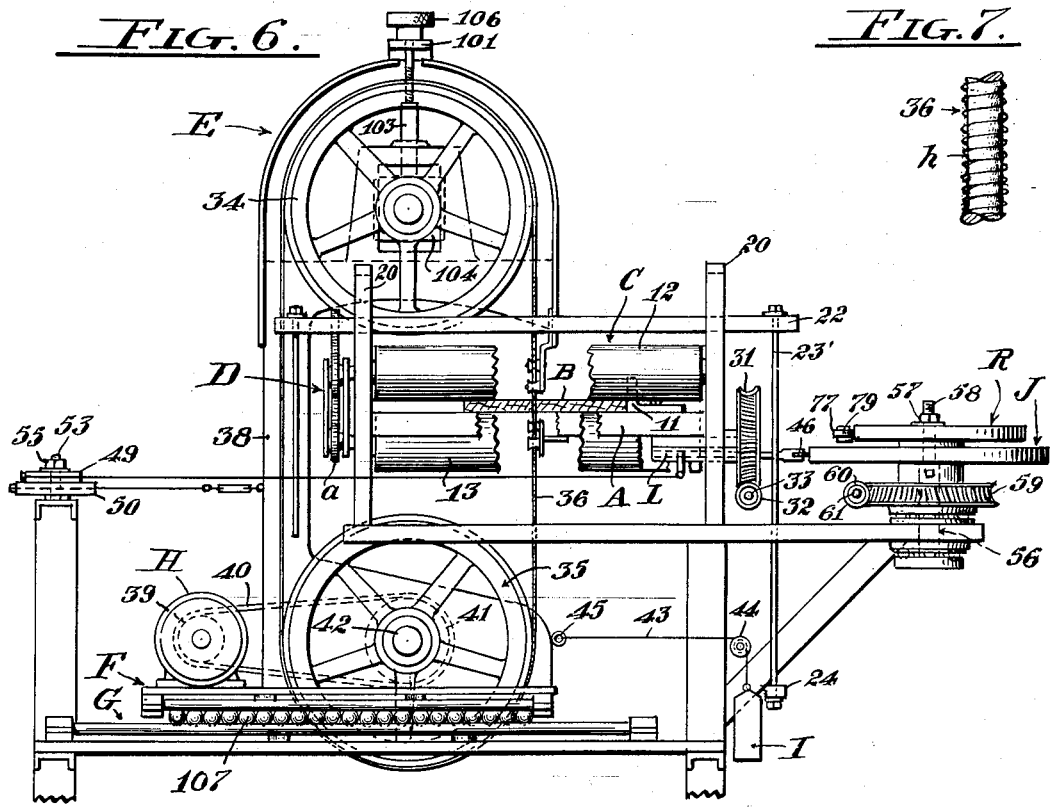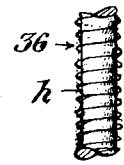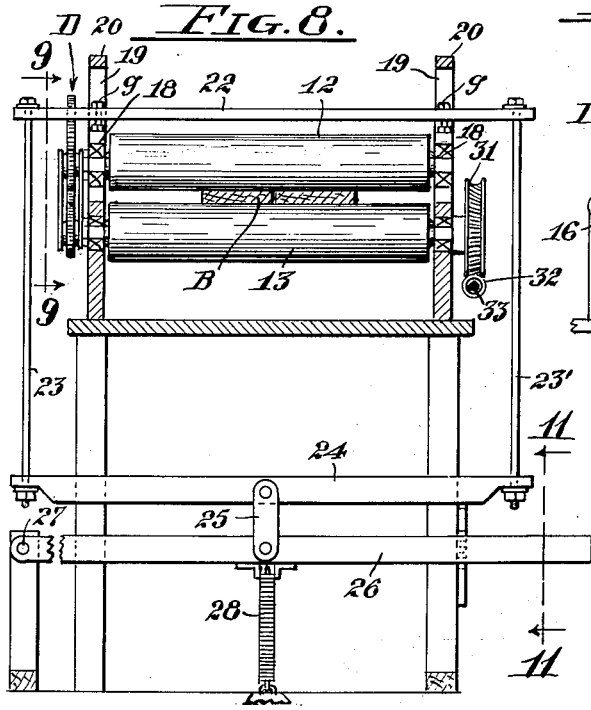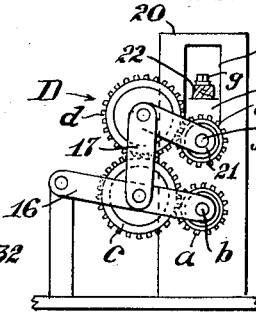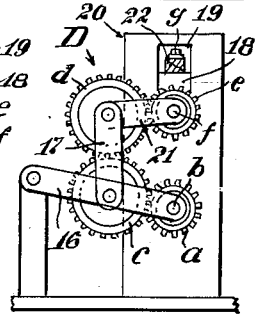

United States Patent Office 2,736,349
Patented Feb. 28, 1956

2,736,349
MACHINE FOR SAWING CONTOURED MARGINS ON STRIPS OR PANELS

Ross M. Francis, Santa Monica, Calif.

Application April 13, 1953, Serial No. 348,437

11 Claims. (Cl. 143—26)

This invention relates to a machine for sawing strips or panels of sheetlike material formed of wood, plastic, metal or other sawable substance to produce contoured or scalloped margins thereon primarily for ornamental purposes, and has as its primary object the provision of a mechanism embodying a band saw which is arranged and operable to sever a sheet material in a manner to automatically cut a uniform contoured margin of predetermined design thereon while the sheet is being advanced rectilineally.

A particular object is to provide a construction in a machine of the above character in which the band saw may be bodily reciprocated and advanced and retracted to move the blade thereof in transverse relation to a rectilineally advancing sheet, in which such movement of the saw is controlled by a revolving pattern cam and in which cams of various patterns or contours may be interchanged and utilized to effect varied movement of the saw, thereby enabling the production of a variety of contoured patterns on the margins of sawed sheet material.

Another object is to provide a means for adjustably varying the length of the reciprocal travel of the saw blade transversely of an advancing strip or panel of sheet material to vary the transverse depth of the sawed contours.

Another object is to provide a means for varying the speed of travel of the advancing strip or panel relative to the reciprocal transverse movement of the saw blade so as to vary the length of the contoured pattern being sawed.

Another object is to provide automatic means for decreasing the speed of travel of the advancing sheet relative to the reciprocal transverse movement of the saw blade while in operation at the termination of a stroke thereof, particularly where reversal of the direction of transverse movement of the saw blade is abrupt, whereby sharp angular contours may be cut.

Another object is to provide automatic means for instantly terminating transverse movement of the saw and feed of the sheet being worked in event of breakage of the saw blade.

Another object is to provide a substantial mounting for the band-saw carriage whereby movement thereof will be facilitated and whereby compensation for wear occasioned by travel of the carriage may be readily made.

A further object is to provide a construction whereby initial positioning in the machine of the sheet to be worked is facilitated and whereby the machine is adapted to the working of sheets of various thicknesses as well as to the sawing of a plurality of superimposed sheets of various heights in one operation.

It has heretofore been common practice in sawing scalloped or contoured margins on a strip or panel of sheet material for an operator to manipulate the material to feed it to a band saw blade moving on a fixed path of travel; the material being fed to the saw-blade in whatever direction is required to form a particular outline or margin on the material being worked. This practice involves the use of templates or patterns or delineations imposed on the work to define the course of the kerf being cut and necessitates steering and turning of the work as it is fed to the saw. The present invention contemplates the provision of a means whereby the cutting of contoured margins may be effected automatically and which by continuously advancing the work rectilineally or in a straight path of travel, moving the revolving saw-blade transversely of the work while it is being advanced, and effecting such movement of the blade under the control of a pattern cam, a multitude of styles or contours may be sawed by use of a variety of cam patterns amplified by varying the speed of travel of the work relative to the saw-blade and also varying the length of reciprocal travel of the blade transversely of the advancing work. With the foregoing objects in view together with such other objects and advantages as may subsequently appear the invention resides in the parts and in the combination, construction and arrangement of parts hereinafter described and claimed and as illustrated by way of example in the accompanying drawings in which:

Fig. 1 is a diagrammatic plan view of the contour sawing machine with parts broken away and depicting the driving and control mechanism;

Fig. 2 is a diagram illustrating the mode of operation of the invention;

Figs. 3 and 4 are plan views of lengths of contoured strips as produced in the manner shown in Figs. 1 and 2;

Fig. 5 is a detail in cross section taken on the line 5—5 of Fig. 1 as seen in the direction indicated by the arrows depicting the mounting of a reciprocal band saw carriage;

Fig. 6 is a view in end elevation with portions broken away as seen in the direction indicated by the arrow 6 in Fig. 1;

Fig. 7 is an exaggerated detail in elevation of a fragmentary portion of the saw blade;

Fig. 8 is a view in cross section taken on the line 8—8 of Fig. 1 illustrating the adjustable means for varying the vertical spacing of a pair of feed rollers;

Fig. 9 is a detail in section and elevation taken on the line 9—9 of Fig. 8 showing the feed roller driving mechanism in a lowered position;

Fig. 10 is a view similar to Fig. 9 showing the feed roller driving mechanism in an elevated position;

Fig. 11 is a view in section and elevation taken on the line 11—11 of Fig. 8 showing the means for holding the feed rollers in various vertically spaced positions relative to each other;

Fig. 12 is a view in section and elevation as seen on the line 12—12 of Fig. 1 depicting the driving and speed control mechanism of the machine;

Fig. 13 is a diagram illustrating the mechanism operable in event of breakage of the band saw blade to immediately stop operation of the feed mechanism;

Fig. 14 is a plan view of a sawed strip depicting the manner of varying the contoured pattern shown in Figs. 3 and 4 by increasing the speed of travel of the work relative to the transverse movement of the saw blade; and Fig. 15 is a similar view showing the manner in which the pattern depicted in Figs. 3 and 4 may be varied by increasing the length of reciprocal travel of the saw blade.

Referring to the drawings more specifically A indicates generally a bed or table constituting a work support on which a strip or panel B of sheet material such as wood, plastic, metal and other substances capable of being sawed, may be advanced longitudinally under the urge of two pairs of feed rollers C in a conventional fashion; the bed A being provided with an upstanding laterally adjustable flange 11 against which one longitudinal margin of the strip B slidably abuts to afford a guide for the latter.

The pairs of feed rollers C each include upper and lower parallel driven rollers 12 and 13 with the pairs of rollers suitably spaced apart longitudinally of the bed A and extending transversely of the latter; the lower feed rollers 13 having their upper peripherial portions extending through transverse slots 14 in the bed A and projecting slightly thereabove for engagement with the under side of the strip B being worked. The upper rollers 12 of the pairs of rollers C are arranged to bear on the upper face of the strip B with the rollers 12 geared to the rollers 13 so as to be positively driven in unison therewith and thus co-operate with the rollers 13 in frictionally engaging the strip B and effecting its longitudinal movement over the bed A.

The feed rollers 12 are so mounted relative to their companion rollers 13 as to be adjustable vertically relative thereto so as to adapt the rollers to various thicknesses of strips B being fed therebetween and also to permit elevation of the upper rollers 12 relative to the bed A to facilitate initial positioning of the strip B between the feed rollers or its removal therefrom. The geared connection between the rollers of each pair of feed rollers C is particularly shown in Figs. 9 and 10 and comprises complementary trains of gears D for each of the pair of rollers C each of which embodies a spur gear $a$ mounted on one end of the shaft $b$ of the lower feed roller 13 on the other end of which shaft is mounted an impelling worm gear 31. The pinion $a$ meshes with a gear $c$ journalled on a bracket 16 which gear $c$ meshes with a corresponding gear $d$ journalled on the upper end of a link 17 the lower end of which link is pivoted on the bracket 16 axially of the gear $c$. The gear $d$ meshes with a pinion $e$ mounted on the shaft $f$ of the upper feed roller 12 which shaft is journalled in bearings 18 slidably mounted for vertical adjustment in guideways 19 formed in standards 20 extending upwardly from the bed A at the ends of the pairs of rollers C. The upper end of the link 17 connects with a rocker arm 21 the outer end of which connects with the shaft $f$ of the upper feed roller 12 which roller by the arrangement set forth may be shifted vertically by raising or lowering its bearings 18 in the guide-ways 19 and yet be maintained in geared connection with the lower roller 13. The means for effecting vertical adjustment of the upper feed rollers 12 is particularly shown in Fig. 8 and embodies a horizontally extending cross bar 22 arranged slightly above the upper feed roller 12 with its end portions extending through the guide-ways 19 and connected to the bearings 18 as by bolts $g$. The outer ends of the cross bar 22 are connected to depending rods 23—23' which connect with the end portions of a second cross-bar 24 disposed beneath the bed A. The cross-bar 24 is fitted intermediate its ends with a depending link 25 which is pivoted at its lower end to a vertically movable lever 26 operable to raise and lower the cross bars 24—22 and the upper rollers 12. The lever 26 is pivoted at 27 and is connected intermediate its ends to a coil spring 28 which exerts a downward pull on the arm 26 and operates through the connections between the latter and the upper feed roller 12 to exert a yieldable downward pressure on the latter such as to cause it to frictionally engage the strip B under such pressure. Means are provided as shown in Fig. 11 for holding the lever 26 and its connection at various elevated positions in opposition to the spring 28 which means embodies an inclined arrangement of notches or steps 29 on a panel 30 disposed diagonally beneath the outer free end portion of the arm 26 on which notches or steps the arm is adapted to be seated to support it in the desired elevated position; the arm being sufficiently loosely supported to permit its being swung laterally in and out of engagement with the several steps 29. A complementary feed roller adjusting means as just above described is provided for each of the pair of feed rollers C.

The shafts $b$ carrying the lower feed rollers 13 are fitted at the ends thereof opposite the pinions $a$ with worm wheels 31 which mesh with worms 32 on a shaft 33 whereby the rollers 13 are driven from the shaft 33 in corresponding directions; the pairs of worm gears 31—32 being complementary so as to drive the feed rollers C at corresponding speeds. The mechanism for driving the shaft 33 and the feed rollers will later be described.

In carrying out the invention a conventional band saw E is provided which embodies the usual pair of vertically spaced pulleys 34 and 35 around which passes a continuous band saw blade 36 one lead of which passes through a transversely extending slot 37 in the bed A in the path of travel of the strip B. The blade 36 is characterized by being cylindrical and having fine, closely arranged spirally formed teeth $h$ surrounding its periphery throughout the length thereof whereby the blade is rendered capable of sawing in any direction radially thereof. The formation of the saw blade is particularly shown in Fig. 7.

The band saw E is fixedly carried on a reciprocal carriage F mounted for horizontal movement beneath and in transverse relation to the bed A on a pair of tracks or guide-ways G; a standard 38 being mounted on the carriage F on which the pulleys 34 and 35 are journalled in a conventional manner. The band saw E is driven by a motor H mounted on the carriage F; the drive shaft of the motor being fitted with a pulley 39 engaged by a belt 40 passing around a pulley 41 on the shaft 42 of the band saw pulley 35. The reciprocal carriage F is advanced toward the bed A by pull means here shown as comprising a weight I attached to a cable 43 leading around a direction roller 44 and connected at 45 to a forward portion of the base of the standard 38; the cable in effect being connected to the forward end of the carriage F.

Retraction of the carriage F in opposition to the weight I is effected by means of a rotary pattern cam J which on being revolved actuates a reciprocal slide K mounted in a fixed guide-way L on the underside of the bed A; the slide K being fitted at one end with a roller 46 arranged to abut and traverse the contoured periphery of the pattern cam J, and connected at its other end with a cable 47 passing around a direction roller 48 and connected to a lever 49 fixed relative to a pivoted plate 50 to the periphery of which is attached a cable 51 connecting at 52 to the standard 38.

The plate 50 is pivoted on a vertically extending stud shaft 53 the upper end of which projects through a longitudinally extending elongated slot 54 in the lever 49 which is held against rotation relative to the plate 50 but is adjustable longitudinally thereof so that the outer end of the lever connected to the cable 47 may be disposed in various spaced relations to the axis of the plate 50. A clamping nut 55 screwed on the stud shaft 53 clamps the lever 49 in fixed relation to the plate 50 in any desired adjusted position.

The lever 49 and plate 50 are formed with transversely arcuate relatively opposed ends 49' and 50' respectively over which the cables 47 and 51 longitudinally extend with the cable ends attached to side margins of the lever and plate by bolts $h'$ and $h''$ as shown in Fig. 1, by which arrangement the end portions of the cable attached to the lever and plate are maintained in uniform spaced relation during rocking movement of the lever and plate thereby insuring uniform movement of the carriage F throughout the length of its path of travel which is effected by movement of the slide K in one direction and by the weight I in the other direction. The lever 49 and plate 50 constitute collectively an oscillatory horizontally extending rocker arm fulcrumed on the shaft 53 and adapted to be varied in its length by reason of the relative longitudinal adjustability of the lever and plate members 49 and 50 whereby the throw of the rocker arm and the length of travel of the carriage F controlled thereby may be varied relative to the length of stroke of the slide K which is determined by the cam J.

The cam J is detachably mounted on the upper end portion of a vertically extending revoluble shaft 56; the cam being keyed on the shaft and removably clamped in place by a nut 57 screwed on a threaded end extension 58 of the shaft 56. As a means of rotating the shaft 56 and the cam J thereon the shaft is equipped with a worm wheel 59 engaged by a worm 60 on a shaft 61 which may be driven from any suitable source of power but preferably that which is utilized in driving the feed rollers C. This driving mechanism is here shown in Fig. 1 as embodying a motor M the drive shaft of which is equipped with a pulley 62 engaging a belt 63 passing around a pulley 64 fixed on a shaft $i$ supported in a bearing $j$.

A friction drive disk 65 fixed on the shaft $i$ is engaged by a friction wheel 66 on a reciprocal shaft 67; the wheel 66 being engageable with a friction disk 68 on a revoluble and reciprocally mounted shaft 69; the disks 65 and 68 and wheel 66 constituting a conventional variable speed transmission N for controlling and varying the speed of travel of the work feed rollers C and carriage F as will presently appear.

The shaft 69 is fitted with a pulley $k$ which engages a belt $l$ passing around a pulley $m$ on a shaft $n$ (Fig. 12) which in turn is fitted with a pulley $o$ engaging a belt $p$ passing around a pulley $q$ on the shaft 33 paralleling the shaft 61. A spur gear $r$ on the shaft 33 meshes with an end gear $s$ of a train of spur gears O the other end gear $t$ of which is mounted on the shaft 61; the train of gears O being interchangeable with other sets of gear trains to provide a variety of speed variations between the shafts 61 and 33. For this purpose the intermediate gears of the train O are mounted on a bracket P adjustably mounted about the shaft 61; the bracket P being formed with a series of elongated slots $u$ to afford variable mountings for the intermediate gears of the train O. The shaft 67 carrying the friction wheel 66 is slidably mounted in a bearing 71 and is attached at its outer end through a link 72 with an upstanding lever 73 pivoted at 74 for rocking movement whereby the shaft 67 may be shifted longitudinally to advance or retract the friction wheel 66 relative to the disks 65 and 68 in effecting variable speed transmission between the motor M and the driven shafts 33 and 61. A horizontal cable 75 attached to the lever 73 below the pivot 74 passes over a direction roller 76 and connects with a weight Q which acts to pull the lower end portion of the lever 73 in the direction of movement positioning the friction roller 66 in its neutral position centrally of the driving disk 65.

Means are provided for automatically decelerating advance of the strip B when the cam J effects or permits change of direction of movement of the slide K and consequent movement of the carriage F and the band saw E thereon, which means is here shown as embodying a second cam R fixed on the shaft 56 in spaced superposed relation to the cam J to rotate in unison with the latter. An arm 77 pivoted at 78 intermediate its ends has a roller 79 on one end thereof arranged to bear on the contoured margin of the cam R to impart a rocking motion to the arm 77 on rotation of the cam R. A cable 80 connected to the outer end of the arm 77 passes around direction rollers 81 and 81' and is connected by an adjustable connection 82 to the lever 73 at a point spaced to one side of the pivot 74 opposite the connection of the cable 75 therewith whereby the weight Q exerting a pull on the cable 75 will impose a pull on the cable 80 and arm 77 to maintain the roller 79 in contact with the cam R. By this arrangement the cam R is adapted to cooperate with the weight Q in effecting rocking movement of the feed control lever 73 to vary the speed of travel of the feed rollers C and of the carriage F through the change speed transmission N under the timing action of the cam R.

Means are provided for automatically terminating operation of the machine in event of breakage of the band saw blade 36, which means is particularly shown in Fig. 13 and embodies mechanism whereby on breaking of the band saw blade the friction disk 68 of change speed transmission N may be moved out of operative engagement with its driving roller 66. The aforesaid mechanism embodies a rocker arm 83 pivoted at 84 and arranged with a roller 85 on its outer end abutting a collar 86 on the shaft 69 carrying the disk 68 and which shaft as before stated is mounted for longitudinal reciprocal movement; the shaft 69 being supported in bearings 87 and 88 and being normally positioned with the friction disk 68 abutting the wheel 66 under the urge of a coil spring 89 encompassing the shaft 69 and bearing between the collar 86 and the bearing 87 and tensioned to urge the shaft 69 in a direction to hold the friction disk 68 against the wheel 66. The outer end of the rocker arm 83 is connected to a pull spring 90 tending to swing the rocker arm 83 so that the wheeled end portion thereof will bear against the collar 86 and tend to retract the shaft 69 in opposition to the spring 89 which latter however is tensioned to slightly overcome the pull of the spring 90 so that the latter of itself will not retract the shaft 69.

Connecting with the rocker arm 83 between the roller 85 and the pivot 84 is a rod 91 the outer end of which is connected to a rocker arm 92 pivoted at 93 and having an end portion 92' to which is attached a pull spring 94 tensioned to tend to swing the arm 92 in a direction to exert a pull on the connecting rod 91 to exert a pull on the wheeled end of the rocker arm 83 in opposition to the spring 89; the spring 94 thus co-operating with the spring 90 to normally oppose the spring 89 and hold the shaft 69 and friction disk 68 in their retracted position. The rocker arm 92 however is held in a retracted position in opposition to the spring 94 by a trigger arm 95 pivoted at 96 having an end portion 95' arranged to be positioned to form a releasable abutment for the outer end portion 92' of the rocker arm 92. A normally energized solenoid 97 has the core thereof connected to the end portion of the trigger arm 95 opposite the end portion 95' which solenoid acts to maintain such end portion 95' in abutting engagement with the end portion 92' of the arm 92 as shown in full lines in Fig. 13 in opposition to a pull spring 98 connected to the arm portion 95'. The terminals of the solenoid 97 connected with conductors 99—100 which lead to the terminals of a normally open micro-switch S in an electric circuit T but which switch is arranged to be closed under the influence of tension imposed on the band saw blade 36 in such manner that breaking of the band saw blade in relieving such tension will cause the switch S to open thereby breaking the circuit through the solenoid 97 to de-energize the latter and thereby cause the spring 98 to swing the trigger arm 95 out of engagement with the rocker arm 92 so that the springs 94 and 90 will come into play to retract the shaft 69 and friction disk 68 in opposition to the spring 89 and before described.

As here shown the switch S embodies contact members $u$ and $v$ of which the contact $u$ is mounted on a spring arm 101 and is disposed to be moved into electrical engagement with the contact $v$ on depression of the arm 101 which is effected by imposing a thrust thereon through the medium of an adjusting screw 102 engaged with an internally threaded sleeve 103 on an adjustable bearing 104 in which the shaft 105 carrying the upper band saw pulley 34 is supported; the screw 102 being fitted with a head 106 bearing on the spring arm 101 to exert a thrust on the latter so as to close the switch contacts $u$ and $v$ to each other on adjusting the bearing 104 to elevate the pulley 34 relative to the lower pulley 35 in tightening the band saw blade 36 on the pulleys.

In order that reciprocal movement of the carriage F may be effected with a minimum of resistance the carriage is mounted on ball bearings 107 interposed between the carriage and the tracks or guide-ways G each of which latter comprises a pair of rails each of which is composed of a pair of parallel contiguous bars 108—108' and 109—109' as shown in Fig. 5 and between and on the upper peripheral portions of which the balls 107 are seated. Mounted on the under side of the carriage F adjacent one margin thereof is a pair of parallel contiguous bars 110—110' which seat on the balls 107 bearing on the bars 108—108'; and mounted on the under side of the carriage F adjacent the other edge thereof is a single bar 111 which seats on the axial upper portion of the balls 107 seated on the tubes 109—109' which single bar is arranged on the side of the carriage presented in the direction of thrust imposed on the saw blade by the advancing strip B.

In the operation of the invention, a pattern cam J of desired marginal contour is fixedly mounted on the shaft 56 and the slide K is disposed with the follower roller 46 on the outer end thereof disposed in abutting relation to the periphery of the cam. The lever 49 is adjusted longitudinally on the plate 50 relative to the shaft 53 according to the desired length of travel of the carriage F whereupon the lever 49 is fixedly clamped relative to the plate 50 by tightening the clamping nut 55 against the lever 49; the length of travel of the carriage F being determined by the extent of projection of the cable carrying end of the lever 49 relative to the axis of the plate 50. The greater this projection the less the peripheral length of travel of the plate 50 and the shorter the length of travel of the carriage F, and vice-versa. As before stated the lever 49 and plate 50 comstitute in effect an adjustable rocker arm at least one end portion of which may be varied in length relative to the other.

The roller 46 on the slide K will then be maintained in contact with the contoured edge of the cam J by the action of the weight I in exerting an outward longitudinal thrust on the slide K through the cable 43, standard 38 on the carriage F, cable 51, plate 50, lever 49 and cable 47. On setting the cam J in motion by driving the shaft 61, the ascending portions of the contoured margin of the cam will operate to move the slide K rearwardly thereby imparting a pull on the cable 47 such as to swing the lever 49 and plate 50 to thereby pull the cable 51 and thus retract the carriage F in opposition to the weight I on the cable 43. When descending portions of the cam contour are presented to the slide K the weight I will act to advance the carriage F through the cable 43. The cam J may obviously be formed with dwell portions by the provision of which the carriage F may be maintained stationary when it is desired to saw a straight kerf lengthwise of the work.

To feed the strip or panel B to the saw blade 36, the transmission N is set in operation by means of the motor M to thereby drive the feed rollers C through the driving mechanism connected to the transmission as before described; the strip B being fed between the rollers C with one edge of the strip guided along the flange 11. The strip B is thus advanced longitudinally on a straight or rectilineal path of travel to the downwardly moving lead of the revolving saw-blade 36 which travels laterally of the strip B, as indicated in Fig. 2, and acts on engaging the advancing strip B to sever the latter lengthwise along a path to form a kerf U determined by the contour of the pattern cam J coupled with the throw of the carriage governed by the set of the lever 49, and with the selected speed of travel of the strip B. These factors may be varied to provide numerous designs of the resultant contours on the adjacent edges of the severed sections of the strip B as indicated in Figs. 14 and 15 depicting modifications of the pattern produced by the particular pattern cam J here shown; Fig. 14 showing the same pattern shown in Figs. 3 and 4 but enlarged both longitudinally and transversely as by increasing the speed of advance of the strip B and also increasing the length of travel of the carriage E, and Fig. 15 showing the same pattern as in Figs. 3 and 4 as modified by increasing the length of travel of the carriage E without increase in speed of the strip B.

The relative speed of travel of the strip B to the peripheral speed of the cam J may be varied by varying the transmission gear train O. In this fashion the strip B is severed into two sections W and X which by use of the cam shown forms one section with a general concave marginal pattern and forms the other section with a general convex marginal pattern. Manifestly the sawed pattern produced on completion of a single rotation of the pattern cam will be duplicated on each succeeding revolution of the cam throughout the length of a strip B severed by the saw.

A feature of the invention is the employment of a spirally toothed band saw blade since this form of blade comprises a cylindrical wire with the teeth encircling its perimeter whereby the blade will effect a cutting action in all directions radially thereof.

The mode of varying the vertical spacing of the feed rollers C, of automatically retarding or decelerating the speed of rotation of the machine and of stopping the operation in event of breaking of the band saw blade has been previously set forth.

Manifestly various designs of contours may be produced by the employment of variously contoured cams J of which a large variety may be provided; each design of contour being subject to variation in the length and depth of the pattern afforded by varying the feed of the strip B and the length of travel of the carriage F and band saw E as herein set forth.

By the provision of cylindrical bars 108—108', 109—109', 110—110' and 111 engaging the ball bearings 107 as shown in Fig. 5, wear on such bars may be readily compensated for by adjusting the bars circumferentially in their mountings to present new points of contact with the balls.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a machine for sawing contoured margins on strips or panels, a bed for horizontally supporting the work during sawing thereof, feed mechanism for advancing the work rectilineally along said bed, a band saw embodying a vertical blade arranged to engage the work advancing on said bed, said band saw being mounted for reciprocal movement to move the blade thereof back and forth in transverse relation to the work, means for bodily advancing said band saw in one direction, and powered cam means for moving said band saw in a reverse direction in opposition to said advancing means.

2. In a machine for sawing contoured margins on strips or panels, a bed for horizontally supporting the work during sawing thereof, feed mechanism for advancing the work rectilineally along said bed, a band saw embodying a vertical blade arranged to engage the work advancing on said bed, said band saw being mounted for reciprocal movement to move the blade thereof back and forth in transverse relation to the work, pull means for bodily advancing said band saw, and powered cam means for retracting said band saw in opposition to said pull means.

3. In a machine for sawing contoured margins on strips or panels, a bed for horizontally supporting the work during sawing thereof, feed mechanism for advancing the work rectilineally on said bed, a band saw embodying a vertical blade arranged to engage the work advancing on said bed, said band saw being mounted for reciprocal movement to move the blade thereof back and forth in transverse relation to the work, a weight, means connected to and actuated by said weight for bodily advancing said band saw, and powered cam means for retracting said band saw in opposition to said weight.

4. In a machine for sawing contoured margins on strips or panels, a bed for horizontally supporting strips or panels of sheet material being sawed, means for advancing the material rectilineally on said bed, a band saw embodying a vertical blade arranged to engage the sheet material advancing on said bed, a horizontally reciprocal carriage on which said band saw is mounted movable toward and away from said bed, means on said carriage for driving said band saw blade, means for advancing said carriage toward said bed to move said blade transversely of the advancing sheet material, and powered cam means for retracting said carriage away from said bed in opposition to said carriage advancing means.

5. The structure called for in claim 4 together with adjustable means for varying the lentgh of travel of said carriage.

6. The structure called for in claim 4 together with an interchangeable gear train for varying the speed of travel of said carriage relative to that of the sheet material advancing on said bed.

7. In a machine for sawing contoured margins on sheet material, means for horizontally advancing the material rectilineally at selected speeds, a band saw having a vertical blade arranged in the path of the advancing material, a horizontally reciprocal carriage on which said band saw is mounted for bodily movement to advance and retract said blade transversely of the advancing sheet material, means for moving said carriage in a direction to advance said blade, a rotary contoured cam, means actuated by said cam to retract said carriage in opposition to its advancing means, and adjustable means for selectively varying the length of travel of said carriage.

8. The structure called for in claim 7 together with interchangeable means for selectively varying the speed of movement of said carriage relative to the advancing material.

9. In a machine for sawing contoured margins on sheet material, a band saw having a vertically extending blade, a horizontally reciprocal carriage on which said band saw is mounted, means on said carriage for driving said band saw, a rocker arm, a cable connecting one end of said carriage to said rocker arm, a slide, a cable connecting said slide and rocker arm, a revoluble pattern cam for actuating said slide in a direction to retract said carriage through said cables and rocker arm, means for advancing said carriage, and means for feeding a strip to be sawed rectilineally to said band saw blade.

10. In a machine for sawing contoured margins on sheet material embodying a band saw having a vertically extending blade; feed rollers for rectilineally advancing a strip to be sawed to said blade, mechanism for bodily moving said band saw back and forth in transverse relation to the advancing strip, and adjustable means in said mechanism for varying the length of transverse travel of said band saw.

11. The structure called for in claim 10 together with means for automatically momentarily decelerating the speed of travel of said band saw at the change of direction of movement thereof while said band saw is in motion.

References Cited in the file of this patent

UNITED STATES PATENTS

| | | |
|---|---|---|
| 714,529 | Stark | Nov. 25, 1902 |
| 1,001,338 | Berstein | Aug. 22, 1911 |
| 1,275,167 | Loveland | Aug. 6, 1918 |
| 1,615,088 | Klieber | Jan. 18, 1927 |
| 1,616,880 | Swanstrom | Feb. 8, 1927 |
| 1,872,718 | Flanigan | Aug. 23, 1932 |
| 2,043,603 | Allward | June 9, 1936 |
| 2,083,682 | Balsiger et al. | June 15, 1937 |
| 2,090,195 | Grob | Aug. 17, 1937 |
| 2,311,268 | Tannewitz | Feb. 16, 1943 |
| 2,455,423 | Lansing | Dec. 7, 1948 |
| 2,500,321 | Petersen | Mar. 14, 1950 |
| 2,548,698 | Benge | Apr. 10, 1951 |
| 2,555,056 | Pence | May 29, 1951 |
| 2,589,624 | Miller | Mar. 18, 1952 |
| 2,607,373 | Crane | Aug. 19, 1952 |
| 2,669,261 | Bowers et al. | Feb. 16, 1954 |

OTHER REFERENCES

Kinematics and Kinetics of Machinery, by Dent & Harper, 1921 edition, pages 310 to 312.